(12) United States Patent
Holicki et al.

(10) Patent No.: US 8,569,669 B2
(45) Date of Patent: Oct. 29, 2013

(54) NAVIGATION METHOD FOR A MISSILE

(75) Inventors: Michael Holicki, Munich (DE);
Nikolaus Schweyer, Munich (DE);
Juergen Zoz, Friedberg (DE)

(73) Assignee: LFK-Lenkflugkoerpersysteme GmbH, Schrobenhausen (DE)

( * ) Notice: Subject to any disclaimer, the term of this patent is extended or adjusted under 35 U.S.C. 154(b) by 231 days.

(21) Appl. No.: 13/069,814

(22) Filed: Mar. 23, 2011

(65) Prior Publication Data
US 2011/0233322 A1    Sep. 29, 2011

(30) Foreign Application Priority Data

Mar. 24, 2010 (DE) .......................... 10 2010 012 445
Feb. 11, 2011 (DE) .......................... 10 2011 010 987

(51) Int. Cl.
*F42B 15/01* (2006.01)
*F41G 7/00* (2006.01)
*G01S 13/89* (2006.01)
*F42B 15/00* (2006.01)
*G01S 13/00* (2006.01)

(52) U.S. Cl.
USPC .......... 244/3.17; 382/100; 244/3.1; 244/3.15; 244/3.16; 244/3.19; 244/3.2; 342/25 R; 342/25 A; 342/52; 342/53; 342/61; 342/62; 342/63; 342/64; 342/175; 342/195

(58) Field of Classification Search
USPC ........ 244/3.1–3.3, 75.1, 76 R, 175, 183, 184, 244/185; 89/1.11; 701/400; 342/25 R–25 F, 342/52–55, 61–66, 175, 195; 382/100, 103
See application file for complete search history.

(56) References Cited

U.S. PATENT DOCUMENTS

| 3,041,011 | A | * | 6/1962 | Dhanes | 244/3.17 |
| 3,071,765 | A | * | 1/1963 | Schutz | 342/64 |
| 3,737,120 | A | * | 6/1973 | Green | 244/3.17 |
| 3,879,728 | A | * | 4/1975 | Wolff | 342/64 |
| 4,490,719 | A | * | 12/1984 | Botwin et al. | 342/64 |
| 4,993,662 | A | * | 2/1991 | Barnes et al. | 244/3.17 |
| 5,260,709 | A | * | 11/1993 | Nowakowski | 342/62 |
| 5,430,445 | A | * | 7/1995 | Peregrim et al. | 342/25 C |
| 5,455,587 | A | * | 10/1995 | Schneider | 342/62 |
| 5,485,384 | A | * | 1/1996 | Falconnet | 342/25 A |
| 5,564,650 | A | * | 10/1996 | Tucker et al. | 244/3.17 |
| 5,716,032 | A | * | 2/1998 | McIngvale | 244/185 |

(Continued)

FOREIGN PATENT DOCUMENTS

| DE | 693 06 069 T2 | 4/1997 |
| DE | 10 2007 054 950 A1 | 8/2009 |
| EP | 0547637 A1 * | 6/1993 |

OTHER PUBLICATIONS

Dipl.-Ing, Brigit Wessel, "Automatic Extraction of Roads from SAR Image Data", Institute of Institute of Photogrammetry and Cartography, Department of Photogrammetry and Remote Sensing, Technical University Munich, Mar. 7, 2006, (Twenty (25) pages).

*Primary Examiner* — Bernarr Gregory
(74) *Attorney, Agent, or Firm* — Crowell & Moring LLP

(57) ABSTRACT

A SAR image recorded by a reconnaissance system is transferred as a reference edge image together with the data of the trajectory as a reference. The signal of the infrared seeker head of the missile is converted into a virtual SAR edge image and compared to the SAR reference image to calculate the precise position of the missile.

1 Claim, 1 Drawing Sheet

(56) References Cited

U.S. PATENT DOCUMENTS

| | | | |
|---|---|---|---|
| 5,755,400 A * | 5/1998 | Kalms, III | 244/3.17 |
| 6,347,264 B2 * | 2/2002 | Nicosia et al. | 342/64 |
| 6,422,508 B1 * | 7/2002 | Barnes | 244/3.16 |
| 6,691,947 B2 * | 2/2004 | La Fata | 244/3.19 |
| 6,727,841 B1 * | 4/2004 | Mitra | 342/25 R |
| 6,982,666 B2 * | 1/2006 | Temes et al. | 342/64 |
| 7,032,858 B2 * | 4/2006 | Williams | 244/3.15 |
| 7,537,181 B2 * | 5/2009 | Owens et al. | 244/3.14 |
| 8,212,711 B1 * | 7/2012 | Schultz et al. | 342/25 A |

* cited by examiner

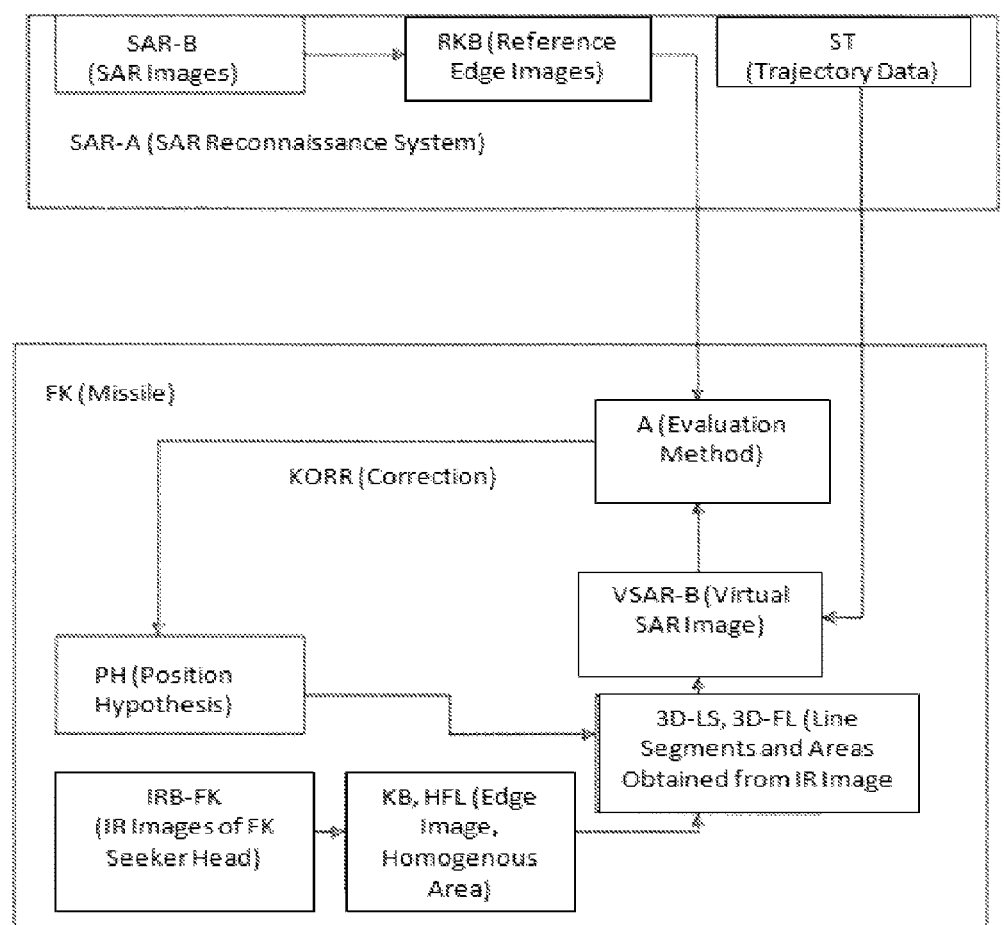

NAVIGATION METHOD FOR A MISSILE

CROSS REFERENCE TO RELATED APPLICATIONS

This application claims priority under 35 U.S.C. §119 to German Patent Application No. 10 2011 010 987.0, filed Feb. 11, 2011 and German Patent Application No. 10 2010 012 445.1, filed Mar. 24, 2010, the entire disclosures of which are herein expressly incorporated by reference.

BACKGROUND AND SUMMARY OF THE INVENTION

Exemplary embodiments of the present invention relate to a navigation method for a missile, which comprises an infrared seeker head, an inertial navigation system (INS) and a device for the comparative evaluation of images just recorded with stored reference images. In accordance with exemplary embodiments an evaluation initially involves producing a multiplicity of three-dimensional (3D) lines for the three-dimensional reconstruction of the detected scene from the recorded images, and these lines are compared, taking into consideration the perspective of the reference available, and the current location and position of the missile is determined therefrom.

Various methods are known for the navigation of a missile. This includes first the use of a satellite navigation system (e.g., GPS—Global Positioning System), which allows a precise navigation only as long as the communication with the corresponding satellite is not disturbed.

Furthermore, inertial navigation systems are known, the precision of which, however, decreases with increasing flight distance. The combination of the two referenced systems does not result in the desired uninterrupted guidance along a specific flight route in every exemplary configuration.

It is therefore necessary to use a further system which processes image material recorded before the respective mission and provide it as a reference in the navigation computer of the missile. Reference structures of this type can be obtained from maps, satellite images or aerial photographs.

During the mission, for example, the seeker head takes over, which is directed from above at the flight path of the missile and continuously generates images, which are processed in the navigation computer of the missile and compared to the data of the aforementioned systems. It is customary to use infrared cameras for this purpose.

German patent document DE 10 2007 054 950 A1 discloses a method for supporting independent navigation of a missile having a forward looking camera and an inertial navigation system (INS), which compares the data from the current scene recorded by the camera to the reference images available in the missile. In particular, a multiplicity of three-dimensional lines is determined from the recorded images using a three-dimensional reconstruction. The multiplicity of three-dimensional lines are projected in the perspective of the available reference images. Subsequently, by aligning with the reference, the current position and location of the missile is determined and the navigation is supported. The alignment with an optical image is thus carried out. Therefore, it is sufficient to project the three-dimensional image generated from the camera image into a reference image. According to the object, this specification is specifically related to the use of a camera designed for the infrared range or for the visible range and the processing of the data thereof. There is no discussion of the use of systems that operate in other frequency ranges or to the special processing of the data of systems of this type.

To an increasing extent, reconnaissance systems operate using a radar with synthetic aperture (SAR). SAR sensors are powerful systems for long-distance reconnaissance. They are all-weather capable and provide a high spatial resolution, even for objects at a great distance. However, due to the special characteristics of this imaging principle, the interpretation of SAR images is difficult and very different from conventional image material.

German patent document DE 69306069 T2 describes a method that aligns a reference image to the SAR image of the missile in order to support navigation of the missile. This is achieved essentially through the correlation of the SAR image with the reference image. Ultimately, with this method only a 2D-2D alignment is carried out. With respect to the treatment of the known SAR artifacts, it is mentioned only that they lead to a slight deformation of the geometry of the image. In an oversimplification it is assumed that, despite this deformation, a correlation between the SAR image and the reference image leads to a correct localization of the missile and any errors in altitude that occur can subsequently be treated with methods of interference calculation. However, when the overflown scene has raised objects, such as high buildings, etc., the deformation of the geometry is no longer slight and a 2D-2D alignment will lead to imprecise results.

Exemplary embodiments of the present invention provide an expansion of known navigation systems for operation with reference images generated on an SAR basis, which is able to correctly resolve scenes with large differences in height.

This is achieved according to exemplary embodiments of the present invention by using SAR (Synthetic Aperture Radar) images as a reference, which originate from an SAR reconnaissance system at an earlier time, with a detected known trajectory and saved the data of the overflown terrain and from which reference images composed of three-dimensional line segments are generated, wherein together with the trajectory data associated with the respective image they are provided as a reference for the navigation method of the missile, and from the images of the infrared seeker head homogeneous areas bounded by three-dimensional lines and the spatial position thereof are obtained. Taking into consideration the three-dimensional structure of the overflown scene for each detected three-dimensional object, the corresponding azimuth position and range position are calculated, and the layover effects of the SAR images are modeled. Using analysis of the masking of three-dimensional areas, the SAR shadow edges are generated in the virtual reference edge image, and the virtual SAR images originating from the images of the infrared seeker head and generated from the calculations are compared to the reference edge images available as a reference and the trajectory data by means of a comparative evaluation, and continuously updated position data and location data of the missile are calculated therefrom.

Typical SAR artifacts are the reason that SAR images cannot simply be processed with the methods of the evaluation of an infrared image. An SAR image differs from an infrared image in that for each pixel the direction and the distance to the pixel, not location coordinates, are measured. As long as a scene is flat, this leads to images of equal quality, since in this case there is a clear connection between aspect angle and distance.

However, this situation changes when the scene is no longer flat or, for example, contains higher buildings. In this case, the SAR image generates, from the individual points of the building façade, a mirror image folded onto the ground, because these points lie at the same distance as their mirror image on the ground. This is referred to as the layover effect.

Another artifact is the so-called SAR shadow. This occurs when, due to the shielding of other objects in a certain distance range, no reflections occur. These SAR shadows often form clearly visible edges in SAR images, but have no counterpart in the optical image. These shadows mean that a direct alignment of SAR image and optical image leads to errors for scenes with raised objects.

The methods cited in the above-referenced patent documents, in which optical images and SAR images are compared directly with one another, consequently lead to a systematic positioning error.

The particular advantage of exemplary embodiments of the present invention can be seen in that for the first time a missile with infrared seeker head is using the image data of a high-precision SAR reconnaissance system as reference images, whereby it has been possible to clearly improve the precision of the navigation compared to previous systems.

Other objects, advantages and novel features of the present invention will become apparent from the following detailed description of one or more preferred embodiments when considered in conjunction with the accompanying drawings.

BRIEF DESCRIPTION OF THE DRAWINGS

One exemplary embodiment of the invention is shown diagrammatically simplified in the only FIGURE of the drawing and is described in more detail below.

DETAILED DESCRIPTION OF THE DRAWINGS

The drawing initially shows two functional switching circuits. The one with reference character SAR-A stands symbolically for an SAR reconnaissance system which, at an earlier time and with known trajectory, has detected and stored the data of the terrain over which the mission of the missile FK is to take place. The missile FK is illustrated with its components essential for understanding the present invention as a second functional switching circuit.

The reconnaissance system SAR-A records a SAR image and extracts therefrom a multiplicity of line segments, which together produce the reference edge image RKB. This reference edge image RKB is provided to the missile FK for the mission as a reference, as is indicated by an arrow.

Furthermore, in the reconnaissance system SAR-A, the data of the sensor trajectory ST are recorded and likewise transmitted to the missile FK. This is likewise shown by an arrow.

During the mission, the camera installed in the seeker head of the missile FK continuously records images of the scene below the missile, wherein the camera is directed obliquely forwards. The generated infrared images IRB-FK are subsequently processed. The three-dimensional structure of the scene below the missile FK is calculated using a three-dimensional reconstruction, as is described in German patent document DE 10 2007 054 950 A1, the entire disclosure of which is herein expressly incorporated by reference. The result is a multiplicity of three-dimensional line segments LS, which correspond to the edge images of the scene.

At the same time, in the infrared images IRB-KFK homogeneous areas, which are bordered by the three-dimensional line segments LS, are extracted using a processing technique known in the art as Region Growing. The three-dimensional structure of the line segments that surround the areas is used to determine the three-dimensional location of these areas. The result of this reconstruction process is a multiplicity of line segments LS and three-dimensional areas HFL. A virtual SAR image VSAR-KB is then determined from this. The stored data of the sensor trajectory ST are taken into consideration hereby. This three-dimensional structure makes it possible, together with the known trajectory of the reconnaissance system SAR-A and a hypothesis originating from the internal inertial navigation system for the current position of the missile FK, to determine a hypothesis for the three-dimensional structure of the SAR image. To this end, the three-dimensional lines segments LS are projected into the SAR plane, taking into consideration the layover effect. The three-dimensional areas HFL and their location are used to find the position of the relevant geometric effects such as shadow edges and corner reflectors. The result is then a virtual SAR image.

With the aid of line matching processing techniques, the virtual SAR image VSAR-B is then aligned in the next step A with the SAR edge image RKB stored as a reference. From the disparity of the two images a correction KORR of the position hypothesis PH of the missile FK can then be calculated. Thus, a missile with infrared seeker head using the image data of a high-precision SAR reconnaissance system as reference images is provided, which clearly improves the precision of the navigation compared to previous systems.

It is important with this method for converting an infrared image into an SAR image that the geometric characteristics typical of SAR are taken into consideration in the same manner as if an SAR image just recorded is compared to a stored SAR reference image. This is the only way that the advantage of the high resolution can be utilized in the SAR evaluation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE CHARACTERS

A Evaluation method
FK Missile
HFL Homogenous area
INS Inertial navigation system
IRB-FK Infrared images of the FK seeker head
KB Edge image with three-dimensional lines
KORR Correction
LS Line segment
PH Position hypothesis
RKB Reference edge images
SAR Synthetic Aperture Radar
SAR-A SAR reconnaissance system
SAR-B SAR images
ST Trajectory data
VSAR-B Virtual SAR image
3D-FL Line segments in three-dimensional obtained from infrared image
3D-LS Areas in three-dimensional obtained from infrared image

What is claimed is:

1. A navigation method for a missile that includes an infrared seeker head, an inertial navigation system and a device that performs comparative evaluation of images just recorded with stored reference images,
    wherein the comparative evaluation includes initially producing a multiplicity of three-dimensional lines for a three-dimensional reconstruction of a detected scene from the just recorded images, comparing the multiplicity of three-dimensional lines taking into consideration a perspective of the stored reference images, and determining a current location and position of the missile using the comparison of the multiplicity of three-dimensional lines, wherein synthetic aperture radar (SAR) images are used as the stored reference images, the SAR images originating from a SAR reconnaissance system, which at an earlier time and with known detected trajectory saves data of overflown terrain, and virtual reference edge images composed of three-dimensional line segments are generated from the SAR images, wherein the virtual reference edges images and associated trajectory data are provided as a reference for the navigation method of the missile, wherein homogeneous areas bounded by the three-dimensional lines and spatial position are obtained from the just recorded images of the infrared seeker head, and a corresponding azimuth position and range position are calculated for each detected three-dimensional object taking into consideration a three-dimensional structure of the overflown terrain for each detected three-dimensional object, wherein layover effects of the SAR images are modeled and SAR shadow edges are generated in the virtual reference edge image using masking analysis of three-dimensional areas, wherein virtual SAR images originating from the just recorded images of the infrared seeker head and generated from the calculations are compared to the virtual reference edge images and the trajectory data using a comparative evaluation, and continuously updated position data and location data of the missile are calculated therefrom.

* * * * *